(12) United States Patent
Triano et al.

(10) Patent No.: US 10,257,557 B2
(45) Date of Patent: Apr. 9, 2019

(54) CUSTOMIZED MEDIA STREAMS

(71) Applicant: AT&T INTELLECTUAL PROPERTY I, L.P., Atlanta, GA (US)

(72) Inventors: Stephen Francis Triano, Hillsborough, NJ (US); James Gordon Beattie, Jr., Bergenfield, NJ (US); Roque Rios, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/750,648

(22) Filed: Jun. 25, 2015

(65) Prior Publication Data
US 2016/0381408 A1 Dec. 29, 2016

(51) Int. Cl.
G06F 3/00 (2006.01)
G06F 13/00 (2006.01)
H04N 5/445 (2011.01)
H04N 21/2668 (2011.01)
H04N 21/258 (2011.01)
(Continued)

(52) U.S. Cl.
CPC ... H04N 21/2668 (2013.01); H04N 21/21805 (2013.01); H04N 21/2393 (2013.01); H04N 21/252 (2013.01); H04N 21/25883 (2013.01); H04N 21/478 (2013.01);
(Continued)

(58) Field of Classification Search
CPC .......... H04N 21/2668; H04N 21/2393; H04N 21/252; H04N 21/25883; H04N 21/4781; H04N 21/8133; H04N 21/478
See application file for complete search history.

(56) References Cited

U.S. PATENT DOCUMENTS 5,729,471 A * 3/1998 Jain ...................... H04N 13/139
725/131
6,934,002 B1 * 8/2005 Setteducati ............ G03B 19/18
348/E7.071
(Continued)

FOREIGN PATENT DOCUMENTS

WO 2005022890 A2 3/2005
WO 2007030621 A1 3/2007

OTHER PUBLICATIONS

Dwyer, B. et al., "For Love or Money: Developing and Validating a Motivational Scale for Fantasy Football Participation", Journal of Sport Management, vol. 25, No. 1, 2011, pp. 70-83.
(Continued)

Primary Examiner — Nasser M Goodarzi
Assistant Examiner — Patrick A Ryan
(74) Attorney, Agent, or Firm — Toler Law Group, PC

(57) ABSTRACT

A method includes receiving, at a server, first information provided by a user that identifies a set of people to be monitored. The method includes accessing, at the server, second information associated with a plurality of media streams including a broadcast media stream and a non-broadcast media stream. The second information identifies particular people associated with individual media streams of the plurality of media streams. The method includes generating, at the server, a customized media stream based on a comparison of the first information and the second information. The customized media stream includes media content related to the set of people, where the media content includes at least a portion of the non-broadcast media stream.

20 Claims, 4 Drawing Sheets

(51) Int. Cl.
*H04N 21/25* (2011.01)
*H04N 21/218* (2011.01)
*H04N 21/239* (2011.01)
*H04N 21/478* (2011.01)
*H04N 21/81* (2011.01)
*H04N 21/8549* (2011.01)

(52) U.S. Cl.
CPC ..... *H04N 21/4781* (2013.01); *H04N 21/8133* (2013.01); *H04N 21/8549* (2013.01)

(56) References Cited

U.S. PATENT DOCUMENTS

| | | |
|---|---|---|
| 7,079,176 B1 | 7/2006 | Freeman et al. |
| 7,351,150 B2 | 4/2008 | Sanchez |
| 7,827,202 B2 | 11/2010 | Relyea et al. |
| 7,988,560 B1 | 8/2011 | Heller et al. |
| 8,028,315 B1 | 9/2011 | Barber |
| 8,397,257 B1 | 3/2013 | Barber |
| 8,584,174 B1 | 11/2013 | Fyock et al. |
| 8,702,504 B1 | 4/2014 | Hughes et al. |
| 8,930,405 B2 | 1/2015 | Relyea et al. |
| 2003/0054885 A1 | 3/2003 | Pinto et al. |
| 2004/0073437 A1 | 4/2004 | Halgas, Jr. et al. |
| 2006/0184989 A1 | 8/2006 | Slothouber |
| 2007/0113250 A1* | 5/2007 | Logan ............... H04N 7/17318 725/46 |
| 2010/0195623 A1* | 8/2010 | Narasimhan ........... H04H 20/38 370/332 |
| 2011/0256911 A1 | 10/2011 | Heller et al. |
| 2012/0188452 A1* | 7/2012 | Keiser .................... G06T 13/00 348/559 |
| 2012/0329541 A1 | 12/2012 | Allen et al. |
| 2013/0072307 A1 | 3/2013 | Heller et al. |
| 2013/0158688 A1 | 6/2013 | Barber |
| 2014/0079340 A1* | 3/2014 | Kawano ............ H04N 21/8133 382/305 |
| 2014/0141877 A1 | 5/2014 | Jensen et al. |
| 2014/0189517 A1 | 7/2014 | Hughes et al. |
| 2014/0194173 A1 | 7/2014 | Nicholas et al. |
| 2014/0282667 A1 | 9/2014 | Major et al. |
| 2014/0325567 A1 | 10/2014 | Mangat et al. |
| 2014/0325568 A1 | 10/2014 | Hoang et al. |
| 2015/0163562 A1* | 6/2015 | Leventhal ......... H04N 21/8126 725/116 |
| 2015/0332476 A1* | 11/2015 | Park ...................... H04N 7/188 348/169 |

OTHER PUBLICATIONS

Hutchins, B. et al., "It's Fantasy Football Made Real: Networked Media Sport, the Internet, and the Hybrid Reality of MyFootballClub", Sociology of Sport Journal, vol. 26, No. 1, 2009, pp. 104-106.

Neeson, C., "Game Changer: The Effects of Fantasy Football on NFL Fan Behaviour", Research Paper submitted to the University of Dublin, Retrieved from http://www.researchgate.net/profile/Cormac_Neeson/publication, 2014, 47 pages.

Varner, R., "Technological Game Changer: How Social Media and Second Screen Devices Have Changed Sports", Elon University, Retrieved from http://www.russellvarner.com/wp-content/uploads/2014/03/Lit-Review-ACM.pdf, Mar. 2014, 4 pages.

* cited by examiner

CUSTOMIZED MEDIA STREAMS

FIELD OF THE DISCLOSURE

The present disclosure is generally related to customized media streams.

BACKGROUND

Participants in fantasy sports leagues select players to form a fantasy team and are awarded points based on performance of the selected players. A fantasy sports participant may wish to view footage or highlights of sporting events (e.g., exciting plays, scoring events, etc.) in which selected players are playing without watching multiple sporting events over multiple hours or days. Some sports networks have channels dedicated to fantasy sports, but these channels are not customized to focus on an individual fantasy sports team or any particular fantasy sports league (or any particular league participant). Additionally, retrieving fantasy sports information or videos from the internet can be a cumbersome and time-consuming process for a fantasy sports participant.

DETAILED DESCRIPTION

Figure 1:
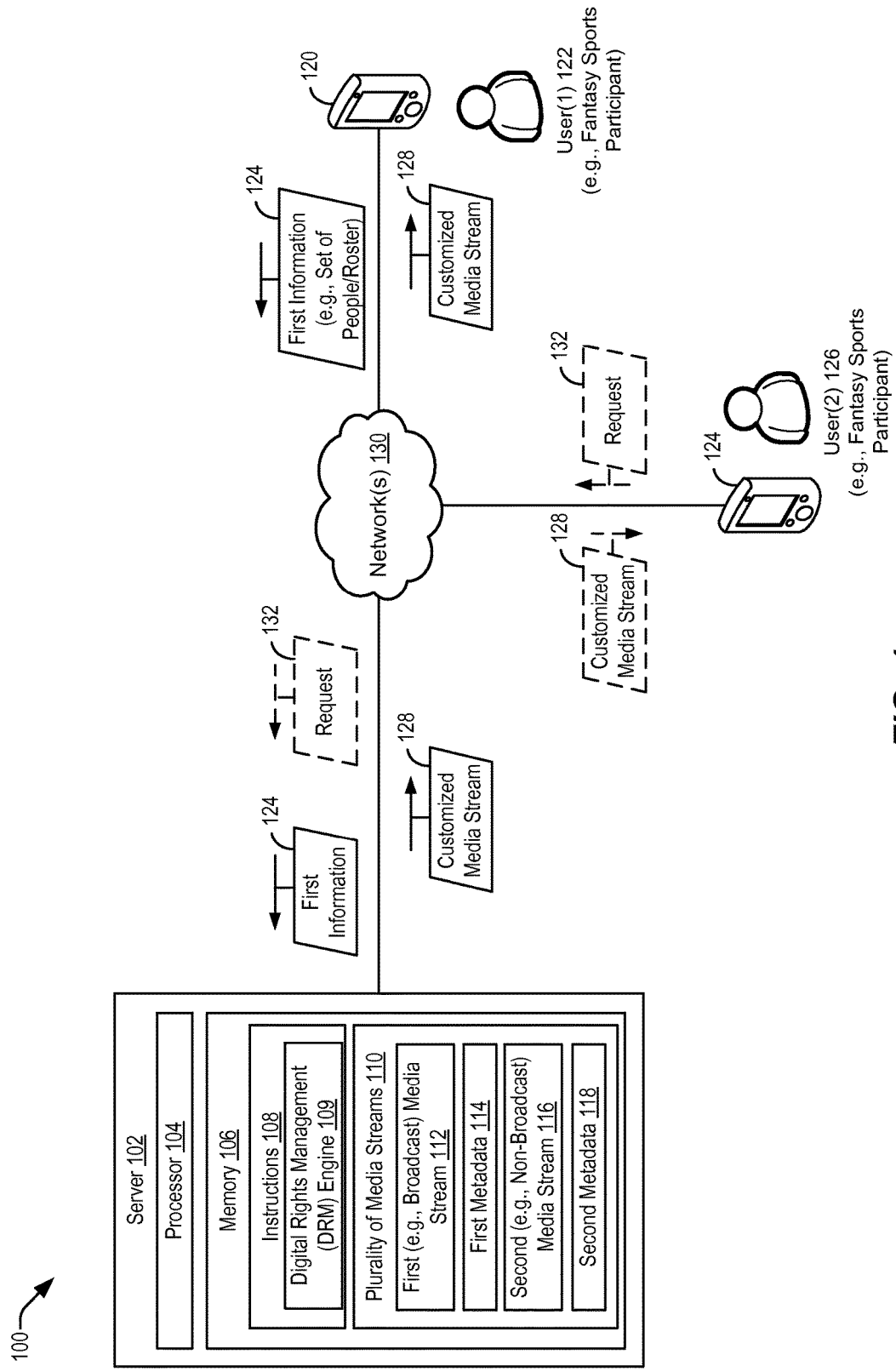
FIG. 1 is a block diagram of an embodiment of a system for generating a customized media stream.

The present disclosure describes systems and methods of generating customized media streams based on a set of people identified by a user. For example, in the context of fantasy sports, the user may correspond to a fantasy sports participant, and a fantasy sports service of a media content provider may provide the fantasy sports participant with a media stream that is customized based on members of a fantasy sports roster that is defined by the fantasy sports participant. To illustrate, a server may access information (e.g., a fantasy sports roster) associated with the fantasy sports participant and may provide a customized media stream to a media playback device associated with the fantasy sports participant. The customized media stream may include data from multiple media streams (e.g., data from a broadcast media stream and data from a non-broadcast media stream). For example, during a sporting event, multiple media capture devices (e.g., cameras, microphones, etc.) may generate media streams. At a particular time, one of the media streams may be selected as a broadcast media stream to be provided via a television channel. However, viewers of the television channel may be unable to view the other media streams (the "non-broadcast" media streams).

As an illustrative, non-limiting example, a particular event (such as an exciting play, a quarterback sack, etc.) may occur during the sporting event. However, the particular event may be captured by another media capture device (that is not selected by an individual in a control booth as the media capture device to provide the broadcast media stream via the television channel). In this case, a fantasy sports participant may be unable to view the particular event via the broadcast stream.

In the present disclosure, a customized media stream may be generated for the participant in order to allow the participant to view players/events that may be interesting to the participant. Media streams may include metadata that may be used by a server to generate the customized media stream. For example, the broadcast media stream may include first metadata, and the non-broadcast media stream may include second metadata. The metadata may indicate information about the corresponding media stream. As an example, the first metadata may identify particular players that are depicted in the broadcast media stream. Other examples of first metadata may include a location of a media capture device that is selected to provide the broadcast media stream, teams involved in the sporting event associated with the broadcast media stream, a timestamp, or other information. The second metadata may include similar information relating to the non-broadcast media stream.

The customized media stream may be provided to the media playback device based on the user information, the first metadata, and the second metadata. The media playback device may include a set-top box device, a television, a phone, a tablet computing device, a laptop computing device, or a desktop computing device (among other alternatives). For example, the server may select media streams to be included in the customized media stream based on a comparison of the user information to the metadata of the media streams. The server may select a media stream (or a portion of a media stream) for the customized media stream based on particular information included in the user information matching information in the first metadata. For example, the user information may include a fantasy sports roster, and the particular information may include a particular player of the fantasy sports roster.

In a particular embodiment, the first metadata is generated and stored in the broadcast media stream in near-real time, and the second metadata is generated and stored in the non-broadcast media stream in near-real time. Generating the metadata in near-real time may allow the server to generate and provide the customized media stream to the media playback device in near-real time. In a particular embodiment, the first metadata and the second metadata are generated by the server in response to receiving the broadcast media stream and the non-broadcast media stream, respectively. For example, the server may be configured to perform automated processing on the media streams to generate the metadata, such as performing optical character recognition to detect a name or a jersey number, performing speech recognition on an audio portion of a media stream to detect a particular name or number, scanning for a particular element (e.g., a bar code, a QR code, a transmitting device embedded in a jersey, etc.), or some other process. In another embodiment, the metadata may be input by operators via user input devices (e.g., by individuals in a "control booth" of a television broadcaster). For example, operators may be tasked with watching the media streams and entering information (e.g., player names, team names, locations, etc.) to be stored as the metadata. After generating the metadata, the metadata may be stored in the corresponding media stream, and the media streams (with the inserted metadata) may be stored at a database accessible via a network, such as a local network, an internet protocol television network, the Internet, or "the cloud."

In a particular embodiment, the customized media stream may be provided to the media playback device in accordance with a highlight filter setting. For example, a first participant may sign up for the fantasy sports service and may create a fantasy sports roster. The first participant may configure highlight filter settings that indicate a type of customized media stream to be generated (e.g., media content streams of scoring highlights, interesting plays, etc.), when to receive highlight content media streams (e.g., during sporting events, at the end of a day, at the end of a week, at the end of a sporting event, etc.), whether to receive media content streams of other participants in the same fantasy league, other settings, or a combination thereof.

In a particular embodiment, the media content stream is organized based on an order of occurrence of events depicted in the broadcast media stream and the non-broadcast media stream. For example, the customized media stream may depict scoring plays by players of the roster in the order that the scoring plays occurred during the corresponding sporting events. In another particular embodiment, the server may provide a notification that indicates an event associated with one of the players of the roster to the media playback device. The notification may include a selectable link to view an additional media content item, information related to the event, or a combination thereof. For example, a notification containing a selectable link to a highlight video or a scoring update may be provided to the media playback device for display to the first participant. Additionally or alternatively, the notification may be provided as a text message to a mobile communications device associated with the first participant.

In addition to providing the customized media stream to the first participant, the customized media stream that is generated for the first participant may be provided to others (e.g., other participants in the fantasy sports league). For example, the server may receive a request for the customized media stream of the first participant from a second media playback device associated with a second participant, and the server may provide the customized media stream to the second media playback device. In this manner, participants in the same fantasy sports league may view customized media streams corresponding to their own rosters as well as customized media streams corresponding to other rosters.

In a particular embodiment, a method includes receiving, at a server, first information provided by a user that identifies a set of people to be monitored. The method includes accessing, at the server, second information associated with a plurality of media streams including a broadcast media stream and a non-broadcast media stream. The second information identifies particular people associated with individual media streams of the plurality of media streams. The method includes generating, at the server, a customized media stream based on a comparison of the first information and the second information. The customized media stream includes media content related to the set of people, where the media content includes at least a portion of the non-broadcast media stream.

In another particular embodiment, an apparatus includes a processor and a memory that is accessible to the processor. The memory includes instructions that are executable by the processor to perform various operations. The operations include receiving first information provided by a user that identifies a set of people to be monitored. The operations include accessing second information associated with a plurality of media streams including a broadcast media stream and a non-broadcast media stream. The second information identifies particular people associated with individual media streams of the plurality of media streams. The operations include generating a customized media stream based on a comparison of the first information and the second information. The customized media stream includes media content related to the set of people, where the media content includes at least a portion of the non-broadcast media stream.

In another particular embodiment, a computer-readable storage device stores instructions that, when executed by a processor, cause the processor to perform various operations. The operations include receiving first information associated with a fantasy sports league participant of a plurality of fantasy sports league participants associated with a fantasy sports league. The first information identifies a set of people corresponding to a fantasy sports roster of the fantasy sports league participant. The operations include accessing second information associated with a plurality of media streams including a broadcast media stream and a non-broadcast media stream. The second information identifies particular people associated with individual media streams of the plurality of media streams. The operations also include generating a customized media stream based on a comparison of the first information and the second information. The customized media stream includes media content related to the set of people, where the media content includes at least a portion of the non-broadcast media stream.

Referring to FIG. 1, a particular embodiment of a system of generating a customized media stream is illustrated and is generally designated 100. FIG. 1 illustrates that a server (or multiple servers) may access information associated with multiple media streams in order to identify people (e.g., fantasy sports roster entries of a particular fantasy sports league participant) associated with the individual media streams. The multiple media streams may include one or more media streams selected for broadcasting ("broadcast" media streams) and one or more media streams that are not selected for broadcasting ("non-broadcast" media streams). By determining which media streams include the identified people, the server may generate a media stream that is customized (e.g., for the particular fantasy sports league participant) to include media content related to the identified people. The media content related to the identified people includes at least a portion of a non-broadcast media stream. As described further herein, the broadcast stream and the non-broadcast stream may capture different aspects of an event (e.g., the same event, such as a sporting event). To illustrate, as described further herein with respect to FIG. 2, a set of media capture devices (e.g., cameras, microphones, etc.) may be associated with the same event (e.g., to capture different views/perspectives of the event). A first media capture device may be selected (e.g., by an individual in a control room of a broadcaster) to provide the broadcast media stream. The non-broadcast media stream may be received from a second media capture device.

In the particular embodiment illustrated in FIG. 1, the system 100 includes a server 102 (or multiple servers). The server 102 includes a processor 104 (or multiple processors) and a memory 106 that is accessible to the processor 104. The memory 106 stores instructions 108 that are executable by the processor 104 to perform various operations, as further described herein. FIG. 1 further illustrates that the memory 106 may store information 110 associated with a plurality of media streams. To illustrate, the information 110 associated with the plurality of media streams may include information associated with a first (e.g., broadcast) media stream 112. In some cases, first metadata 114 may be associated with the first media stream 112. The information 110 associated with the plurality of media streams may also include a second (e.g., non-broadcast) media stream 116. In some cases, second metadata 118 may be associated with the second media stream 116. In the particular embodiment illustrated in FIG. 1, the instructions 108 include a digital rights management (DRM) engine 109. In some cases, media content may be copyrighted. In this case, the DRM engine 109 may be executable by the processor 104 to perform operations associated with determining whether a particular user is able to receive particular media content, determining a content owner to be compensated, or a combination thereof (among other alternatives). In some cases, "blackout" situations may apply to particular media content. As an illustrative example, a user located at a particular zip code may be able to stream media content that is recorded by a local broadcaster for a particular event, while the user may be unable to stream media content recorded by a national broadcaster for the same event.

The system 100 also includes a first media playback device 120 associated with a first user 122. In the particular embodiment illustrated in FIG. 1, the system 100 further includes a second media playback device 124 associated with a second user 126. As further described herein, in some cases, the first user 122 may correspond to a first fantasy sports league participant of a plurality of fantasy sports league participants associated with a particular fantasy sports league. The second user 126 may correspond to a second fantasy sports league participant of the plurality of fantasy sports league participants associated with the particular fantasy sports league.

The server 102 is configured to receive first information 128 provided by the first user 122 (e.g., via the first media playback device 120). The first information 128 identifies a set of people to be monitored. As further described herein, when the first user 122 corresponds to a first fantasy sports league participant, the set of people identified by the first information 128 may correspond to a fantasy sports roster of the first user 122.

The server 102 is configured to access second information associated with each media stream of the plurality of media streams (e.g., the information 110 stored at the memory 106). The information 110 may identify particular people associated with individual media streams of the plurality of media streams. As an example, in the case of a fantasy sports league, the information 110 may identify particular players (or multiple players, such as team defenses). In the particular embodiment illustrated in FIG. 1, the information 110 includes metadata associated with each media stream of the plurality of media streams. To illustrate, the information 110 may include first metadata 114 associated with the first media stream 112 and second metadata 118 associated with the second media stream 116. While FIG. 1 illustrates an example of metadata associated with two media streams, it will be appreciated that metadata associated with an alternative number of media streams may be accessible to the server 102. In the case of a fantasy sports league, the server 102 may be configured to utilize the metadata (e.g., the first metadata 114 and/or the second metadata 118) to determine particular fantasy sports roster entries of the fantasy sports roster that are associated with individual media streams.

FIG. 1 illustrates that the plurality of media streams may include a broadcast media stream (e.g., the first media stream 112) and a non-broadcast media stream (e.g., the second media stream 116). The server 102 is further configured to generate a customized media stream 128 based on a comparison of the first information 124 to the second information (e.g., the information 110 stored at the memory 106). The customized media stream 128 may include media content related to the set of people (e.g., fantasy sports roster entries of the first user 122). The media content related to the set of people includes at least a portion of the non-broadcast media stream (e.g., the second media stream 116 in the example of FIG. 1).

The server 102 may be configured to send the customized media stream 128 to the first media playback device 120 via a network 130 (or multiple networks). FIG. 1 further illustrates that, in some cases, the server 102 may be configured to receive a request 132 for the customized media stream 128 from the second media playback device 124 associated with the second user 126 (e.g., a second fantasy sports league participant). Responsive to the request 132, the server 102 may be configured to communicate the customized media stream 128 (that is generated for the first user 122 associated with the first media playback device 120) to the second media playback device 124 (e.g., via the network 130).

In operation, the first user 122 may provide the first information 124 via the first media playback device 120. While FIG. 1 illustrates an example in which the first media playback device 120 is a phone, it will be appreciated that the first media playback device 120 may be a tablet computing device, a laptop computing device, a desktop computing device, a set-top box device, or a television (among other alternatives). In the example of FIG. 1, the first user 122 provides the first information 124 via the first media playback device 120 and receives the customized media stream 128 via the first media playback device 120. In some cases, the first user 122 may provide the first information 124 via a first device and may receive the customized media stream 128 via a second device. To illustrate, the first user 122 may input roster entries (e.g., a starting lineup for a particular week) via one device. During a sporting event (or multiple sporting events, such as multiple games occurring simultaneously), the first user 122 may receive the customized media stream 128 via a different device (e.g., the first media playback device 120).

The first information 124 may be sent to the server 102 via the network 130. In the example of a fantasy sports league, the first information 124 may identify a first fantasy sports roster of the first user 122 (e.g., a first fantasy sports league participant). In this case, the first information 124 may indicate to the server 102 that the roster entries associated with the first fantasy sports roster are to be monitored. The server 102 may access second information associated with each media stream to determine whether a particular person (e.g., a player or multiple players on the fantasy sports roster of the first user 122) is associated with a particular media stream. As an example, the server 102 may determine, based on the first metadata 114 associated with the first media stream 112, whether a particular person (e.g., a player or multiple players on the fantasy sports roster of the first user 122) is associated with the first media stream 112. As another example, the server 102 may determine, based on the second metadata 118 associated with the second media stream 116, whether a particular person (e.g., a player or multiple players on the fantasy sports roster of the first user 122) is associated with the second media stream 116.

In the example of FIG. 1, the first media stream 112 corresponds to a broadcast media stream (e.g., a media stream that is selected for broadcasting via a television channel in connection with a sporting event). The second media stream 116 corresponds to a non-broadcast media stream (e.g., a different media stream that is not selected for broadcasting). As an illustrative, non-limiting example, as further described herein with respect to FIG. 2, multiple media capture devices (e.g., cameras, microphones, etc.) may be positioned to capture different views of the same event (e.g., a sporting event in the context of a fantasy sports league). To illustrate, a first media capture device (e.g., a first camera) may be positioned to capture a first view of the event, and a second media capture device (e.g., a second camera) may be positioned to capture a second view of the same event. In some cases, an individual in a "control room" of a broadcaster may select a first media stream captured by the first media capture device as the particular media stream for broadcasting (e.g., for broadcasting via a television channel associated with the broadcaster). The other media capture device(s) may continue to capture different view(s) of the event, but the selection of the first media stream as the particular media stream for broadcasting may result in the other media streams representing alternative "non-broadcast" media streams (e.g., media streams that are not broadcast via the television channel).

As an example, the first view of the event that is provided as the first media stream 112 (e.g., the broadcast media stream) may not include a person (or multiple people) of the set of people identified by the first user 122. In the context of a fantasy sports league where the set of people corresponds to a fantasy sports roster of the first user 122, a player (or multiple players, such as a team defense) on the fantasy sports roster of the first user 122 may not be visible in the first view. By contrast, the player (or multiple players) may be visible in the second view of the event corresponding to the second media stream 116 (e.g., the non-broadcast media stream). In this example, the server 102 may include at least a portion of the second media stream 116 in the customized media stream 128 that is generated based on the first information 124 provided by the first user 122. The server 102 may provide the customized media stream 128 to the first media playback device 120 (e.g., via the network 130).

As another example, the first view of the event that is provided as the first media stream 112 (e.g., the broadcast media stream) may capture a person (or multiple people) from a first perspective. In the context of a fantasy sports league, the first view may capture a player (or multiple players, such as a team defense) on the fantasy sports roster of the first user 122 from a first perspective (e.g., a side view). The second view of the event corresponding to the second media stream 116 (e.g., the non-broadcast media stream) may capture the player (or multiple players) from a second perspective (e.g., an overhead view). In this example, the server 102 may include at least a portion of the second media stream 116 in the customized media stream 128 that is generated based on the first information 124 provided by the first user 122. The server 102 may provide the customized media stream 128 to the first media playback device 120 (e.g., via the network 130).

In the example of FIG. 1, the server 102 receives the request 132 for the customized media stream 128 (that is generated for the first user 122) from the second user 126 (e.g., a different fantasy sports league participant). FIG. 1 illustrates that the server 102 may communicate the customized media stream 128 to the second media playback device 124 associated with the second user 126 (e.g., via the network 130). Thus, one fantasy sports league participant may be able to receive customized media streams that are generated for other league participants. In this manner, fantasy sports league participants may be able to monitor not only their own fantasy sports rosters but also the fantasy sports rosters of other league participants.

Thus, FIG. 1 illustrates an example of a system of generating a customized media stream for a particular user (e.g., a fantasy sports league participant) based on a set of people to be monitored. The customized media stream may include media content related to the set of people, where the media content includes at least a portion of a non-broadcast media stream. As further described herein with respect to FIG. 2, the non-broadcast media stream may correspond to a media stream from a media capture device that is not selected to provide the broadcast media stream (e.g., for a sporting event). FIG. 1 further illustrates that a customized media stream that is generated for one user (e.g., a first fantasy sports league participant) may also be provided to another user (e.g., a second fantasy sports league participant).

Figure 2:
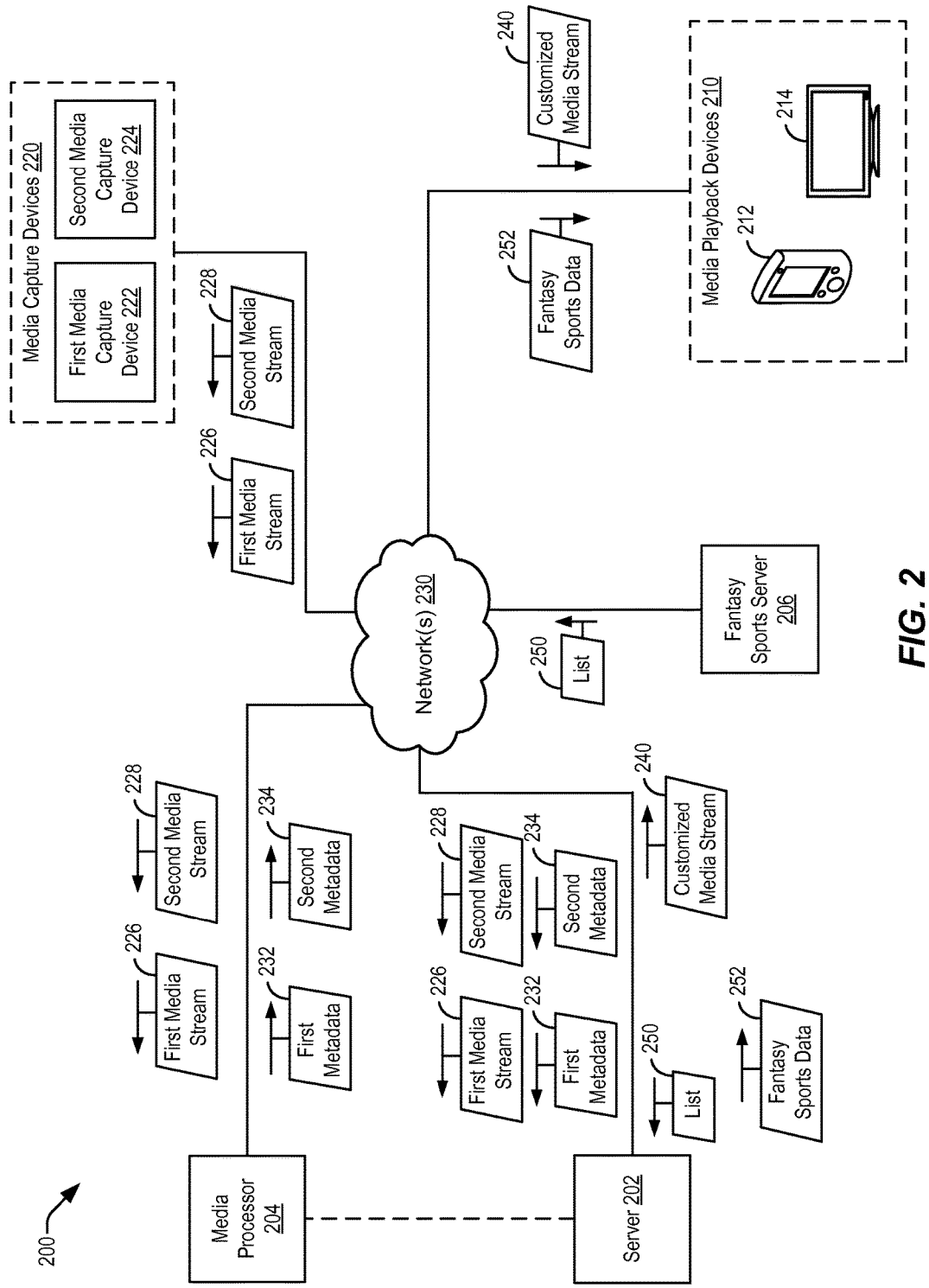
FIG. 2 is a block diagram of another embodiment of a system for generating a customized media stream.

Referring to FIG. 2, another particular embodiment of a system of generating a customized media stream is illustrated and is generally designated 200. FIG. 2 illustrates that multiple media capture devices (e.g., cameras, microphones, etc.) may be associated with the same event (e.g., a sporting event). A first media capture device may be selected (e.g., via an individual in a control room of a broadcaster) to capture a first media stream to be provided as the broadcast media stream for the broadcast media event. In some cases, a second media capture device may capture a second media stream that is not selected as the broadcast media stream (a "non-broadcast" media stream). As further described herein, a customized media stream that is generated for a particular user may include at least a portion of the non-broadcast media stream.

In the particular embodiment illustrated in FIG. 2, the system 200 includes a server 202, a media processor 204, and a fantasy sports server 206. FIG. 2 illustrates that the system 200 may include multiple media playback devices 210. In the example illustrated in FIG. 2, the media playback devices 210 include a first media playback device 212 (e.g., a mobile phone) and a second media playback device 214 (e.g., a television). In other cases, the media playback devices 210 may include alternative numbers and/or types of media playback devices (e.g., tablet computing devices, laptop computers, desktop computers, etc.).

FIG. 2 further illustrates that the system 200 may include multiple media capture devices 220. In the example of FIG. 2, the media captures devices 220 include a first media capture device 222 and a second media capture device 224. In other cases, an alternative number of media capture devices may be utilized. The first media capture device 222 may be configured to capture a first media stream 226, and the second media capture device 224 may be configured to capture a second media stream 228. FIG. 2 further illustrates that the first media capture device 222 may be configured to send the first media stream 226 to the server 202, to the media processor 204, or a combination thereof (e.g., via a network 230, or multiple networks). The second media capture device 224 may be configured to send the second media stream 228 to the server 202, to the media processor 204, or a combination thereof (e.g., via the network 230).

In the particular embodiment illustrated in FIG. 2, the media processor 204 may be configured to generate first metadata 232 for the first media stream 226 and to generate second metadata 234 for the second media stream 228. The media processor 204 may be configured to send the first metadata 232 and the second metadata 234 to the server 202 (e.g., via the network 230). In some cases, the media processor 204 may be further configured to provide the first media stream 226 and the second media stream 228 to the server 202 (e.g., via the network 230). The server 202 may be configured to utilize the first metadata 232 to determine particular fantasy sports roster entries (e.g., of the fantasy sports roster of the first user 122 of FIG. 1) that are associated with the first media stream 226. The server 202 may be configured to utilize the second metadata 234 to determine particular fantasy sports roster entries (e.g., of the fantasy sports roster of the first user 122 of FIG. 1) that are associated with the second media stream 228.

In a particular embodiment, the media capture devices 220 may correspond to a set of media capture devices that are associated with a broadcast media event (e.g., a sporting event). As an example, the first media capture device 222 may be selected to capture a broadcast media stream for the broadcast media event. To illustrate, an individual in a control room of a broadcaster may identify the first media capture device 222 as the particular media capture device to capture the broadcast media stream for broadcasting via a television channel that is accessible to each of the media capture devices 210. In some cases, the second media capture device 224 may capture a non-broadcast media stream for the broadcast media event (to be provided to a subset of the media capture devices 210 as part of a customized media stream 240). As an example, the first media capture device 222 may include a first camera that is positioned to capture a first view of the broadcast media event. As another example, the second media capture device 224 may include a second camera that is positioned to capture a second view of the broadcast media event.

To illustrate, in some cases, a player (or players) on a fantasy sports roster may not be visible in the first media stream 226 captured by the first media capture device 222, while the player(s) may be visible in the second media stream 228 captured by the second media capture device 224. In this case, providing at least a portion of the second media stream 228 to a participant in a fantasy sports league via the customized media stream 240 may allow the participant to view the player that is not visible in the first media stream 226 (that is selected for broadcasting via the television channel). As an illustrative, non-limiting example, the first media stream 226 may provide a view of a throw to a wide receiver. The second media stream 228 may provide a view of a quarterback (e.g., after throwing a pass to the wide receiver). In the event that the throw results in an interception, the first media stream 226 may continue to be broadcast. In this case, the customized media stream 240 may include at least a portion of the second media stream 228 that includes the view of the quarterback, potentially providing the participant with insight into an emotional state of the quarterback as a result of throwing the interception (e.g., frustration with himself, frustration with the receiver, etc.). In some cases, the participant may utilize such information as a factor when determining whether to include the quarterback on her fantasy sports roster for the next week (among other possible uses for the additional information).

As another example, the first media stream 226 captured by the first media capture device 222 may include a first view of a player (or players) on a fantasy sports roster from a first perspective, while the second media stream 228 captured by the second media capture device 224 may include a different view of the player (or players) from a second perspective. To illustrate, the player may correspond to a quarterback, a running back, a wide receiver, a tight end, or a kicker (among other alternatives). The first media stream 226 that is selected for broadcasting may include a view of the player from a sideline perspective, from an offensive perspective, from a defensive perspective, or from an overhead perspective (among other alternatives). In this case, providing at least a portion of the second media stream 228 via the customized media stream 240 may provide a fantasy sports league participant with an alternative view of the player that may be otherwise be unavailable (as the first media stream 226 is selected for broadcasting). As an illustrative, non-limiting example, the first media stream 226 may provide a first view of a running back (e.g., from a sideline perspective). The second media stream 228 may provide a second view of the running back from a different perspective (e.g., from the perspective of the running back moving toward a quarterback to receive a handoff). In the event of a fumble of the handoff, providing the alternative view as part of the customized media stream 240 may provide the participant with more information regarding "fault" (e.g., whether the running back or the quarterback is responsible for the miscue), among other possibilities.

In the particular embodiment illustrated in FIG. 2, the server 202 may be configured to receive information from the fantasy sports server 206. To illustrate, a fantasy sports league participant (e.g., the first user 122 of FIG. 2) may identify a list 250 of players associated with a fantasy sports roster. The server 202 may be configured to utilize the list 250 to determine which players (or sets of players, such as team defenses) are to be monitored in a plurality of media streams (e.g., the first media stream 226 and the second media stream 228). In some cases, the list 250 may be used to determine fantasy sports data 252 (e.g., non-multimedia content, such as player statistics) to be provided to a media playback device associated with a particular user (e.g., the first media playback device 212 or the second media playback device 214). In the particular embodiment illustrated in FIG. 2, the server 202 is illustrated as providing the fantasy sports data 252 to one or more of the media playback devices 210 via the network 230. Alternatively or additionally, the fantasy sports server 206 may provide the fantasy sports data 252 to one or more of the media playback devices 210 via the network 230.

Thus, FIG. 2 illustrates an example of a system of utilizing multiple media capture devices (e.g., cameras, microphones, etc.) associated with a broadcast media event (e.g., a sporting event) to generate a customized media stream for a particular user (e.g., for a fantasy sports league participant). A first media capture device may be selected (e.g., by an individual in a control room of a broadcaster) to capture a first media stream to be provided as the broadcast media stream for the broadcast media event. A second media capture device may capture a second media stream that is not selected as the broadcast media stream (a "non-broadcast" media stream). The customized media stream that is generated for the particular user may include at least a portion of the non-broadcast media stream.

Figure 3:
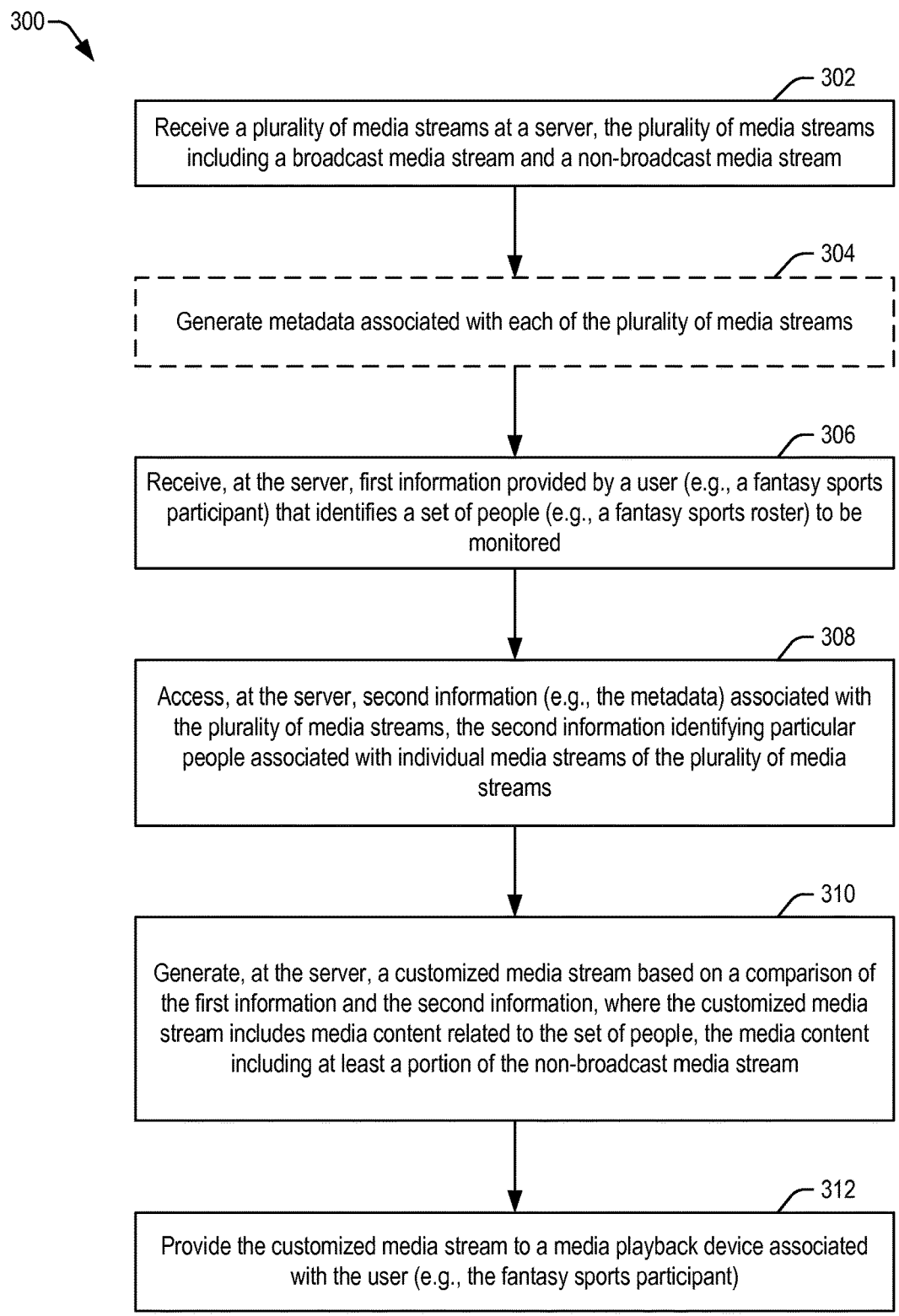
FIG. 3 is a flowchart of an illustrative embodiment of a method to generate a customized media stream.

FIG. 3 illustrates a particular embodiment of a method 300 of generating a customized media stream. In the example of FIG. 3, a server may generate metadata for multiple media streams, and the metadata may be utilized to determine whether particular people (e.g., fantasy sports players) associated with individual media streams. In other cases, as described further herein with respect to FIG. 2, the server may receive metadata that is generated by a media processor.

In the particular embodiment illustrated in FIG. 3, the method 300 includes receiving a plurality of media streams at a server, at 302. The plurality of media streams include a broadcast media stream and a non-broadcast media stream. For example, referring to FIG. 1, the server 102 may receive a plurality of media streams (e.g., via the network 130). In FIG. 1, the media streams include the first media stream 112 (e.g., a broadcast media stream) and the second media stream 116 (e.g., a non-broadcast media stream). In other cases, the server 102 may receive an alternative number of media streams. As another example, referring to FIG. 2, the server 202 may receive the first media stream 226 (captured by the first media capture device 222) and the second media stream 228 (captured by the second media capture device 224) via the network 230.

FIG. 3 illustrates that, in some cases, the method 300 may include generating metadata associated with each of the plurality of media streams, at 304. For example, referring to FIG. 1, the first metadata 114 may be generated for the first media stream 112, and the second metadata 118 may be generated for the second media stream 116. In some cases, the server 102 may generate the first metadata 114 and the second metadata 118. In other cases, the server 102 may receive the first metadata 114 and the second metadata 118 from another source (e.g., via the network 130). To illustrate, in the example of FIG. 2, the server 202 may receive the first metadata 232 and the second metadata 234 from the media processor 204. The media processor 204 may process the first media stream 226 to generate the first metadata 232, and the media processor 204 may process the second media stream 228 to generate the second metadata 234.

The method 300 may include receiving, at a server, first information provided by a user that identifies a set of people to be monitored, at 306. For example, referring to FIG. 1, the server 102 may receive the first information 124 provided by the first user 122 that identifies a set of people to be monitored. In the context of a fantasy sports league, the set of people identified by the first user 122 may include fantasy sports roster entries (e.g., players, team defenses, etc.). As another example, while not shown in the example of FIG. 2, the server 202 may receive the first information identifying the set of people from one of the media playback devices 210 (e.g., the first media playback device 212 or the second media playback device 214).

The method 300 may include accessing, at the server, second information (e.g., metadata) associated with the plurality of media streams, at 308. The second information may identify particular people associated with individual media streams of the plurality of media streams. For example, referring to FIG. 1, the server may access the information 110 associated with the plurality of media streams. In the example of FIG. 1, the information 110 may include the first metadata 114 associated with the first media stream 112 and the second metadata 118 associated with the second media stream 116. The first metadata 114 may identify particular people (e.g., players, teams, etc.) associated with the first media stream 112, and the second metadata 234 may identify particular people (e.g., players, teams, etc.) associated with the second media stream 116. As another example, referring to FIG. 2, the first metadata 232 may identify particular people (e.g., players, teams, etc.) associated with the first media stream 226, and the second metadata 234 may identify particular people (e.g., players, teams, etc.) associated with the second media stream 228.

The method 300 may include generating, at the server, a customized media stream based on a comparison of the first information and the second information, at 310. The customized media stream includes media content related to the set of people, where the media content includes at least a portion of the non-broadcast media stream. In the particular embodiment illustrated in FIG. 3, the method 300 include providing the customized media stream to a media playback device associated with the user, at 312.

As an example, referring to FIG. 1, the server 102 may generate the customized media stream 128 based on a comparison of the first information 124 and the second information (e.g., the information 110, such as the first metadata 114 and the second metadata 118). In the example of FIG. 1, the first user 122 may correspond to a first fantasy sports league participant. In this case, the customized media stream 128 may include media content related to fantasy sports roster entries. As another example, referring to FIG. 2, the server 202 may generate the customized media stream 240, which may be provided to a particular media playback device that identified the set of people to be monitored (e.g., a first user associated with the first media playback device 212 or a second user associated with the second media playback device 214).

Thus, FIG. 3 illustrates an example of a method of generating (and providing) a customized media stream. The customized media stream includes media content related to a set of people (identified by a user for monitoring), where the media content includes at least a portion of a non-broadcast media stream (e.g., a media stream from an alternate media capture device, such as a camera).

Figure 4:
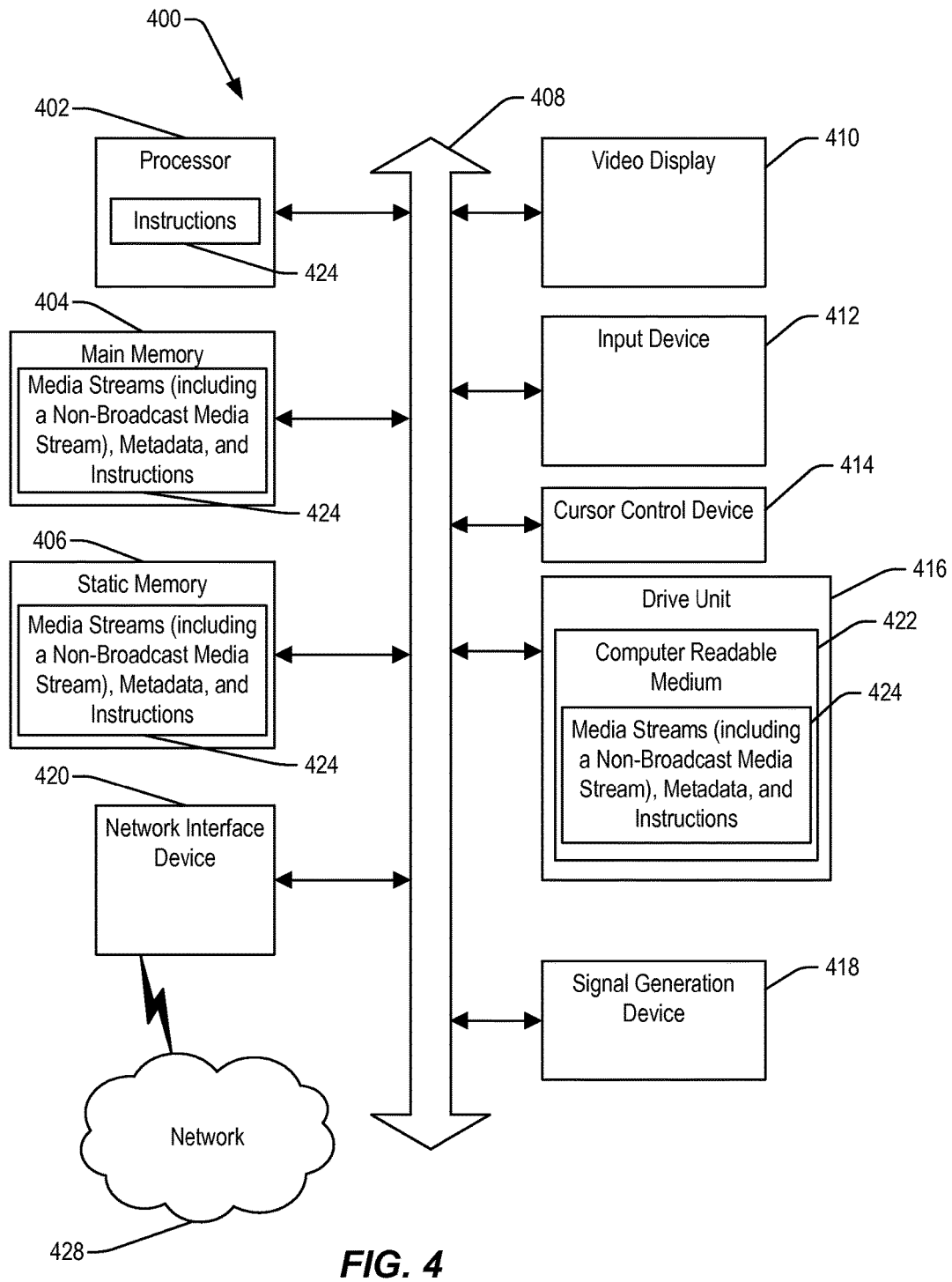
FIG. 4 is a block diagram of an illustrative embodiment of a general computer system.

Referring to FIG. 4, an illustrative embodiment of a general computer system is shown and is designated 400. The computer system 400 includes a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the servers 102, 202, 206, the media processor 204, or the media capture devices 220, described with reference to FIGS. 1 and 2. As another example, the computer system 400 may include or be included within any one or more of the media playback devices 120, 130, 210, described with reference to FIGS. 1 and 2.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 400 may be implemented using electronic devices that provide video, audio, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. For example, the processor 402 may include or correspond to the processor 104 of the server 102 illustrated in FIG. 1, a processor of the servers 202, 206 of FIG. 2, a processor of the media processor 204 of FIG. 2, or a processor of the media capture devices 220 of FIG. 2. As another example, the processor 402 may correspond to a processor of the media playback devices 120, 130 of FIG. 1 or a processor of the media playback devices 210 of FIG. 2. Moreover, the computer system 400 may include a main memory 404 and a static memory 406, which can communicate with each other via a bus 408. For example, the main memory 404 may include or correspond to the memory 106 of the server 102 of FIG. 1, a memory of the servers 202, 206 of FIG. 2, a memory of the media processor 204 of FIG. 2, or a memory of the media capture devices 220 of FIG. 2. As another example, the main memory 404 may correspond to a memory of the media playback devices 120, 130 of FIG. 1 or a memory of the media playback devices 210 of FIG. 2.

As shown, the computer system 400 may further include a video display unit 410, such as a liquid crystal display (LCD), a light emitting diode (LED) display, a touch screen display, a flat panel display, or a solid state display. Additionally, the computer system 400 may include an input device 412, such as a remote control device or a keyboard, and a cursor control device 414, such as a mouse. In some embodiments, the input device 412 and the cursor control device 414 may be integrated into a single device, such as a capacitive touch screen input device. The computer system 400 may also include a signal generation device 418, such as a speaker, and a network interface device 420. Some computer systems 400 may not include an input device (e.g., a server may not include an input device).

In a particular embodiment, as depicted in FIG. 4, the device 400 may include computer-readable storage 422 in which one or more sets of instructions 424, e.g. software, can be embedded. The computer-readable storage 422 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 424 may embody one or more of the methods or logic as described herein. The instructions 424 may be executable by the processor 402 to perform one or more functions or methods described herein, such as the method 300 described with reference to FIG. 4. In a particular embodiment, the instructions 424 may reside completely, or at least partially, within the main memory 404, the static memory 406, and/or within the processor 402 during execution by the computer system 400. The main memory 404 and the processor 402 also may include a computer-readable storage device.

In a particular embodiment (e.g., when the computing device 400 corresponds to a server), the instructions 424 may be executable by the processor 402 to receive first information provided by a user that identifies a set of people (e.g., fantasy sports roster entries in the case of a fantasy sports league) to be monitored. The instructions 424 may be further executable by the processor 402 to access second information associated with a plurality of media streams including a broadcast media stream (or multiple broadcast media streams) and a non-broadcast media stream (or multiple non-broadcast media streams). The second information may identify particular people (e.g., players, player positions, team defenses, etc.) associated with individual media streams of the plurality of media streams. The instructions 424 may be further executable by the processor 402 to generate a customized media stream based on a comparison of the first information and the second information. The customized media stream includes media content related to the set of people (e.g., a fantasy sports roster). The media content includes at least a portion of the non-broadcast media stream.

In a particular embodiment, the instructions 424 may be executable by the processor 402 to perform various operations. The operations may include receiving first information associated with a fantasy sports league participant of a plurality of fantasy sports league participants associated with a fantasy sports league. The first information may identify a set of people corresponding to a fantasy sports roster of the fantasy sports league participant. The operations may include accessing second information associated with a plurality of media streams including a broadcast media stream and a non-broadcast media stream. The second information may identify particular people associated with individual media streams of the plurality of media streams. The operations may also include generating a customized media stream based on a comparison of the first information and the second information. The customized media stream includes media content related to the set of people. The media content includes at least a portion of the non-broadcast media stream. The operations may further include communicating the customized media stream to a media playback device associated with the fantasy sports league participant.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 422 that stores instructions 424, so that a device connected to a network 428 may communicate voice, video or data over the network 428. While the computer-readable storage 422 is shown to be a single device, the computer-readable storage 422 may include a single device or multiple devices, such as a centralized or distributed database, and/or associated caches and servers that store one or more sets of instructions. The computer-readable storage 422 is capable of storing a set of instructions for execution by a processor to cause a computer system to perform any one or more of the methods or operations disclosed herein. For example, the computer-readable storage device 422 may store instructions for execution by a processor to cause a computer system to perform the method 400 described with reference to FIG. 4.

In a particular non-limiting, exemplary embodiment, the computer-readable storage 422 may include a solid-state memory such as embedded memory (or a memory card or other package that houses one or more non-volatile read-only memories). Further, the computer-readable storage 422 may be a random access memory or other volatile re-writable memory. Additionally, the computer-readable storage 422 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 400 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, at a server, first information that identifies a set of people to be monitored;

receiving, at the server, a plurality of media streams including a broadcast media stream of an event and a secondary media stream of the event, wherein the broadcast media stream and the secondary media stream are distinct;

accessing, at the server, second information included in the plurality of media streams, the second information identifying particular people associated with individual media streams of the plurality of media streams; and generating, at the server, a customized media stream, wherein generating the customized media stream includes:

including the broadcast media stream in the customized media stream at a first time in response to the second information including first metadata identifying a first person of the set of people that is depicted in the broadcast media stream at the first time;

including the secondary media stream in the customized media stream at a second time in response to the first metadata indicating that the first person is not included in the broadcast media stream at the second time and the second information including second metadata identifying the first person, wherein the customized media stream is provided in near real-time with respect to the event; and including the secondary media stream in the customized media stream at a third time in response to the first metadata indicating that the first person is included in the broadcast media stream at the third time and the second metadata identifying the first person at the third time.

2. The method of claim 1, wherein the broadcast media stream and the secondary media stream capture different aspects of the event.

3. The method of claim 2, wherein a set of media capture devices are associated with the event, and wherein a first media capture device of the set of media capture devices is selected to capture the broadcast media stream for the event.

4. The method of claim 3, wherein the event includes a sporting event.

5. The method of claim 3, wherein the secondary media stream is received from a second media capture device of the set of media capture devices.

6. The method of claim 5, wherein the first media capture device includes a first camera positioned to capture a first view of the event, and wherein the second media capture device includes a second camera positioned to capture a second view of the event.

7. The method of claim 6, wherein a first person of the set of people is not visible in the first view of the event, and wherein the first person is visible in the second view of the event.

8. The method of claim 6, wherein the first view of the event captures a first depiction of a first person of the set of people from a first perspective, and wherein the second view of the event captures a second depiction of the first person from a second perspective.

9. The method of claim 1, further comprising generating the second information based on the plurality of media streams.

10. The method of claim 9, wherein generating the second information includes performing optical character recognition on a particular media stream of the plurality of media streams to identify a character string in a video portion of the particular media stream, and wherein the second information associates the particular media stream with a particular person responsive to the character string being associated with the particular person.

11. The method of claim 9, wherein generating the second information includes scanning a particular media stream of the plurality of media streams for a particular element, and wherein the second information associates the particular media stream with a particular person in response to the particular element being associated with the particular person.

12. The method of claim 1, further comprising:
receiving, at the server, a request for the customized media stream, wherein the request is received from a second fantasy sports league participant that is different from a first fantasy sports league participant of a plurality of fantasy sports league participants associated with a particular fantasy sports league, and wherein the set of people is defined by a fantasy sports roster of the first fantasy sports league participant; and
communicating the customized media stream to a media playback device associated with the second fantasy sports league participant.

13. An apparatus comprising:
a processor; and
a memory accessible to the processor, the memory comprising instructions executable by the processor to perform operations comprising:
receiving first information that identifies a set of people to be monitored;
receiving a plurality of media streams including a first media stream of an event and a second media stream of the event, wherein the first media stream and the second media stream are distinct;
accessing second information included in the plurality of media streams, the second information identifying particular people associated with individual media streams of the plurality of media streams; and
generating a customized media stream, wherein generating the customized media stream includes:
including the first media stream in the customized media stream at a first time in response to the second information including first metadata identifying a first person of the set of people that is depicted in the first media stream at the first time;
including the second media stream in the customized media stream at a second time in response to the first metadata indicating that the first person is not included in the first media stream at the second time and the second information including second metadata identifying the first person, wherein the customized media stream is provided in near real-time with respect to the event; and
including the secondary media stream in the customized media stream at a third time in response to the first metadata indicating that the first person is included in the broadcast media stream at the third time and the second metadata identifying the first person at the third time.

14. The apparatus of claim 13, wherein the first media stream includes the first metadata and the second media stream includes the second metadata.

15. The apparatus of claim 13, wherein the operations further include communicating the customized media stream to a media playback device, wherein the customized media stream is provided in near real-time.

16. The apparatus of claim 13, wherein the plurality of media streams includes a set of media streams of the event, the set of media streams including the second media stream, wherein the first media stream includes a particular media stream selected from the set of media streams, the particular media stream distinct from the second media stream, and wherein the first media stream is not concurrently broadcast with the second media stream.

17. The apparatus of claim 13, wherein the first media stream corresponds to a television channel stream that is transmitted from the event, and wherein the second media stream corresponds to a camera feed from the event that is not a television channel stream.

18. A computer-readable storage device storing instructions that, when executed by a processor, cause the processor to perform operations comprising:
receiving first information associated with a fantasy sports league participant of a plurality of fantasy sports league participants associated with a fantasy sports league, wherein the first information identifies a set of people corresponding to a fantasy sports roster of the fantasy sports league participant;
receiving a plurality of media streams including a first media stream of an event and a second media stream of the event, wherein the first media stream and the second media stream are distinct;
accessing second information included in the plurality of media streams, the second information identifying particular people associated with individual media streams of the plurality of media streams;

generating a customized media stream, wherein generating the customized media stream includes:
  including the first media stream in the customized media stream at a first time in response to the second information including first metadata identifying a first person of the set of people that is depicted in the first media stream at the first time;
  including the second media stream in the customized media stream at a second time in response to the first metadata indicating that the first person is not included in the first media stream at the second time and the second information including second metadata identifying the first person; and
  including the secondary media stream in the customized media stream at a third time in response to the first metadata indicating that the first person is included in the broadcast media stream at the third time and the second metadata identifying the first person at the third time; and communicating the customized media stream to a media playback device associated with the fantasy sports league participant, and wherein the customized media stream is communicated in near real-time with respect to the event.

19. The computer-readable storage device of claim 18, wherein the operations further include:
  determining that a first camera of a set of cameras is positioned to capture a first view of a sporting event, the first view to be provided by the first media stream; and
  determining that a second camera of the set of cameras is positioned to capture a second view of the sporting event, the second view to be provided by the second media stream.

20. The computer-readable storage device of claim 19, wherein the second view includes a player of the fantasy sports roster.

* * * * *